United States Patent
James

(10) Patent No.: US 6,561,517 B2
(45) Date of Patent: May 13, 2003

(54) PACKING DEVICE FOR ROTARY VALVES

(75) Inventor: Bruce James, Oakville (CA)

(73) Assignee: Stealth International, Inc., Ontario (CA)

( * ) Notice: Subject to any disclaimer, the term of this patent is extended or adjusted under 35 U.S.C. 154(b) by 0 days.

(21) Appl. No.: 09/904,867

(22) Filed: Jul. 16, 2001

(65) Prior Publication Data

US 2003/0011138 A1 Jan. 16, 2003

(51) Int. Cl.[7] ............................................. F16J 15/18
(52) U.S. Cl. ..................... 277/511; 277/520; 277/530; 251/214
(58) Field of Search ............................... 277/511, 530, 277/531, 570, 908; 251/214

(56) References Cited

U.S. PATENT DOCUMENTS

| | | | | |
|---|---|---|---|---|
| 1,969,008 A | * | 8/1934 | Hubbard | 277/530 |
| 2,235,289 A | * | 3/1941 | Dunn et al. | 277/329 |
| 2,456,623 A | * | 12/1948 | Cooper | 277/511 |
| 3,013,830 A | * | 12/1961 | Milligan | 277/439 |
| 3,351,350 A | * | 11/1967 | Shepler | 277/530 |
| 3,469,855 A | * | 9/1969 | Enting | 277/535 |
| 4,082,105 A | | 4/1978 | Allen | |
| 4,116,451 A | * | 9/1978 | Nixon et al. | 277/336 |
| 4,135,546 A | * | 1/1979 | Morrison | 137/315.28 |
| 4,149,558 A | | 4/1979 | McGee et al. | |
| 4,160,551 A | * | 7/1979 | Nixon et al. | 277/530 |
| 4,245,661 A | | 1/1981 | McGee | |
| 4,291,889 A | * | 9/1981 | Hardcastle | 277/328 |
| 4,411,438 A | * | 10/1983 | Scobie | 277/520 |
| 4,474,203 A | | 10/1984 | Meyer | |
| 4,540,012 A | | 9/1985 | Bridges | |
| 4,556,076 A | | 12/1985 | Bridges | |
| 4,630,636 A | * | 12/1986 | Cutcher | 137/315.28 |
| 4,640,305 A | * | 2/1987 | Johnson | 137/312 |
| 4,658,848 A | | 4/1987 | Meyer et al. | |
| 4,682,757 A | | 7/1987 | Shelton | |
| 4,886,241 A | * | 12/1989 | Davis et al. | 251/214 |
| 5,127,629 A | | 7/1992 | Holliday | |
| 5,238,252 A | * | 8/1993 | Stewen et al. | 251/214 |
| 5,732,731 A | | 3/1998 | Wafer | |
| 6,168,161 B1 | * | 1/2001 | Majcen | 277/308 |

FOREIGN PATENT DOCUMENTS

JP 6-58460 * 3/1994

* cited by examiner

Primary Examiner—Anthony Knight
Assistant Examiner—Alison K. Pickard
(74) Attorney, Agent, or Firm—Paul J. Field

(57) ABSTRACT

A packing device, for sealing a longitudinal shaft against leakage of a pressurized fluid, having an elongate valve housing with an annular internal chamber about a coaxial rotatable shaft. The chamber has an inner end with an annular stationary packing support shoulder exposed to pressurized fluid and an outer end with an annular packing access opening exposed to ambient air pressure. Annular self travelling pressure energized retained chevron packing is disposed within the chamber, an inner end thereof engaging the stationary packing support shoulder. An axially slidable ring engages an outer end of the packing, and gland housing engages an outer end of the slidable ring. The gland housing includes compression mountings for loading the packing. For limiting the axial movement of the ring within the chamber when the gland housing is removed, the valve housing includes an annular groove within which a floating retaining clip is slidably disposed.

8 Claims, 1 Drawing Sheet

PACKING DEVICE FOR ROTARY VALVES

TECHNICAL FIELD

The invention relates to a packing device that permits removal of the primary seals, bearings and gland housing while the selfadjusting pressure energized packing remains exposed to pressurized fluid with the valve in any position.

BACKGROUND OF THE ART

Packings around rotating shafts are used in valves and pumps for example to seal off the shafts from leakage of pressurized fluids. Typically, the shaft extends outward of the valve or pump in order to locate drive mechanisms such as electric motors or manual valve wheels externally.

For example, a typical valve includes a valve body with flow inlet and outlet, where the body includes an internal journal bearing located in a bonnet mounted to the valve body. A valve stem is rotationally supported transverse the flow direction within the body or bonnet usually on bearings and a movable disc is threadedly connected on the other end of the valve stem such that when the stem is rotated using a handle or motor, the disc will lift or rotate to open and close the flow passage.

In order to prevent pressurized fluid or gases from leaking out of the valve body through the bonnet adjacent to the rotatable shaft, an annular space is filled with self-adjusting packing compressed around the valve stem shaft with a packing gland to seal between the stem and the bonnet.

However, due to wear and inevitable deterioration of the seals, leaks can developed and the seals are replaced. Also, during preventive maintenance activities seals are regularly replaced before problems can occur. In addition, major difficulty is presented in that pressurized fluid or gas can leak out past the shaft while the packing is being replaced. Particularly, in critical services such as gas pipelines, oil valves, critical water pumps and other machinery, it is highly undesirable to remove the valve or pump from service simply to replace the packing.

In other cases, the bearings (typically located internally and exposed to the flowing media) that rotatably support the shaft or valve stem deteriorate and require replacement or inspection. In such cases, it is also highly desirable to replace the bearings without having to shut off the valve or pump from pressurized fluid access.

U.S. Pat. No. 5,732,731 to Wafer provides a secondary sealed bypass valve for gate valves, which in effect includes an inner auxiliary packing and an outer main packing. This enables bearings and the main packing (outer packing in the bonnet) to be replaced while the temporary inner packing contains pressurized fluids such that leakage does not occur. In normal operation however, the inner packing is bypassed and the outer packing is used for the primary purpose of sealing the rotatable valve stem.

A disadvantage of the Wafer system, of course, is the additional mechanical complexity of providing two separate packings, as well as the necessary axial extension of the bonnet and the valve stem to accommodate the extra length of the valve stem and packings required. Further, such auxiliary or secondary packing require adjustment and eventually deteriorate. As a consequence the valve must be removed from service to replace the inner or auxiliary packing in any case. The provision of a secondary seal therefore in U.S. Pat. No. 5,732,731 to Wafer merely delays the inevitable complete shut down of the valve for service to replace bearings and packing.

U.S. Pat. No. 4,556,076 to Bridges provides a fire resistant valve that includes a secondary seal against pressurized fluid in what is commonly known as a "backseated" valve. An extended flange on the valve stem has a conical sealing surface, which when rotated upwardly engages a conical valve seat in the bonnet providing a metal-to-metal sealing arrangement which is highly useful in emergency situations when the heat from a fire will deteriorate packing and enable the pressurized flammable fluids from within the valve to escape up the valve stem. Backseating arrangements are not only restricted to emergency situations but can also be useful in sealing the valve during replacement of the bearings and primary packing. However, backseating only works when the valve is fully opened or in one position.

A disadvantage of relying on backseating however is that the metal-to-metal contact surfaces can become corroded or pitted. Leakage can occur past such damaged surfaces during replacement of the packing. Such leakage is particularly dangerous in gas or oil pipelines where explosive fumes, poisonous gases, etc. can escape and contaminate the area adjacent to the valve endangering workers and others in the adjacent areas. In addition, the provision of backseated components adds mechanical complexity and cost to the valve.

It is an object of the present invention to provide secondary packing for a shaft seal or valve stem seal that enables shaft bearings and primary O-ring seals on the gland housing to be removed or inspected while the valve or pump remains under full operational fluid pressure such that the pressure energized self adjusting packing seals against the shaft or valve stem automatically.

It is a further object of the invention to provide a pressure energized constantly live loaded and self-contained packing, which enables removal of the bearings, primary seals and gland housing without leakage of pressurized fluid.

It is a further object of the invention to provide a pressure energized packing that automatically adjusts and compensates for removal of gland housing, primary seals and bearings and engages the shaft or valve stem in such a manner that leakage of pressurized fluid is prevented.

Further objects of the invention will be apparent from review of the disclosure, drawings and description of the invention below.

DISCLOSURE OF THE INVENTION

The invention provides a packing device that permits removal of the gland housing with primary seals and bearings while the secondary seal packing remains exposed to and containing the pressurized fluid. The packing device provides for sealing a longitudinal shaft against leakage of a pressurized fluid, having an elongate valve housing with an annular internal chamber about a coaxial rotatable shaft. The chamber has an inner end with an annular stationary packing support shoulder exposed to pressurized fluid and an outer end with an annular packing access opening exposed to ambient air pressure. Annular self-travelling pressure energized retained chevron packing is disposed within the chamber, an inner end thereof engaging the stationary packing support shoulder. An axially slidable ring engages an outer end of the packing, and gland housing with O-ring primary seals and rotary bearings engage an outer end of the slidable ring. The gland housing with primary seals include compression mountings for loading the secondary seal packing. For limiting the axial movement of the ring within the chamber when the gland housing is removed, the valve housing includes an annular groove within which a floating retaining clip is slidably disposed.

Further advantages of the invention will be apparent from the following detailed description and accompanying drawings.

DESCRIPTION OF THE DRAWING

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

Figure 1:
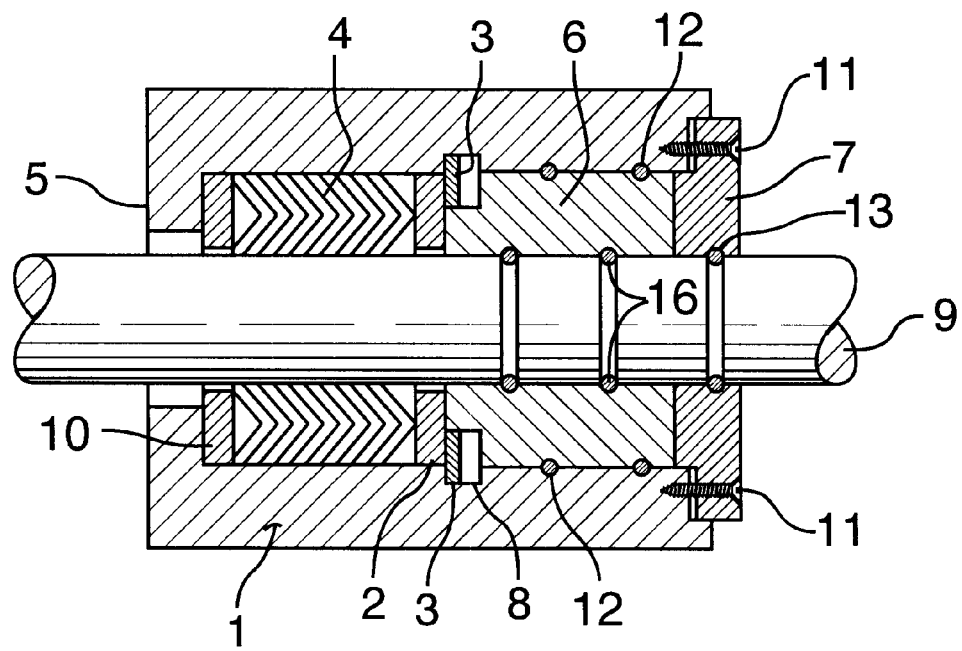
FIG. 1 is a sectional view through the packing device with chevron packing under compression from the gland housing and cap.

FIG. 1 illustrates a valve housing 1, which can represent the bonnet of a valve or sealed bearings of a pump for example, with an annular internal chamber 14 about a coaxial rotatable shaft 9. FIG. 1 shows the valve housing 1 and shaft 9 supported on gland housing 6 and compressed with a cap 7 and adjustable screws 11.

Figure 2:
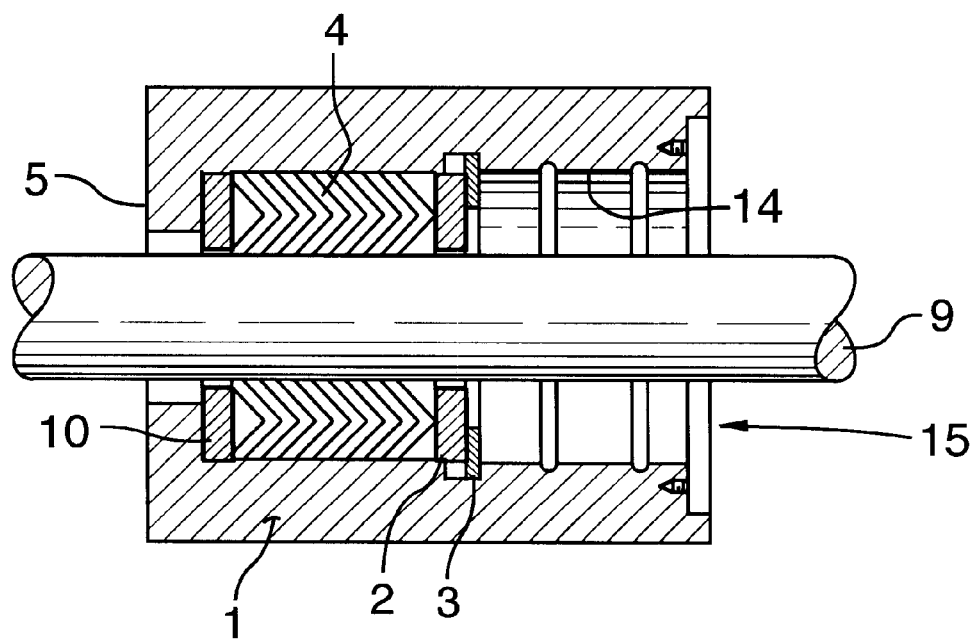
FIG. 2 is a like sectional view with the cap and gland housing removed, and retention clip moved outwardly within the groove.

FIG. 2 shows the same arrangement with gland housing 6 with primary O-ring seals 12, 13, 16 removed by removing screws 11 and cap 7 in order to replace or inspect gland housing 6 with bearings and seals 12, 13, 16 during routine maintenance. Of particular interest in FIG. 2 however the secondary seal packing 4 is an annular chevron shaped packing disposed within the chamber 14 that is self travelling and pressure energized. Pressurized fluid disposed to the left of FIGS. 1 and 2 forces the packing 4 to expand, shift and adjust toward the right forcing ring 2 and retaining clip 3 to move towards the right within groove 8. As a result of the motion and shape compensation of the chevrons 4, the seal is maintained with the shaft 9 despite the removal of the gland housing 6. During normal operation as in FIG. 1, gland housing 6 forces the ring 2 against the shoulder 5 in order to compress the packing 4 and ensure an adequate rotatable seal.

In detail therefore, the invention provides a packing device that seals the longitudinal shaft 9 against leakage of the pressurized fluid, which is exposed to the shoulder 5. The elongate valve housing 1 has an annular internal chamber 14 about the coaxial rotatable shaft 9. The chamber 14 includes an inner end with an annular stationary packing support shoulder 5 exposed to pressurized fluid. The outer end of the chamber 14 includes an annular packing access opening 15 that is exposed to ambient air pressure.

The annular chevron packing 4 is disposed within the chamber 14 with an inner end engaging the stationary packing support shoulder 5 via the packing retention ring 10 in the preferred embodiment illustrated in the drawings. At the outer end of the packing 4 is an axially slidable ring 2. As shown in FIG. 1, during normal operation the gland housing 6 engages the outer end of the slidable ring 2 and the gland housing 6 compresses the ring 2 against the packing 4 when the cap 7 is forced toward the left in drawings illustrated by tightening of screws 11.

As shown in FIG. 2, the invention provides means to limit the axial movement of the ring 2 within the chamber 14 when the gland housing 6 with primary seals 12, 13, 16 and the caps 7 are removed. In the embodiment illustrated an annular groove 8 is provided within the interior of the chamber 14 outward of the packing 4. In the illustrated embodiment a floating C-spring retaining clip 3 is slidably disposed in the groove 8. In this manner the C shaped clip 3 can be removed if necessary with commonly available tools when the packing 4 requires maintenance. Minimal mechanical complexity is introduced into the system as a result. However, it is also possible to include a flange on ring 2 that extends into the groove 8 to equally provide stop means that limit the axial movement of the ring 2. Further, mechanical systems such as sleeves on the shaft 9 or machined shoulders on the shafts 9 can also limit the axial movement of the ring 2 in a like manner.

Preferably, as shown in the drawings the inner end of the packing 4 is likewise retained with a packing retention ring 10 that is positioned between the shoulder 5 and packing 4. Also in the embodiment illustrated, the minimum amount of compression of the packing 4 is provided by a gap between the cap 7 and the associated shoulder of the valve housing 1. Tightening or loosening of the screws 11 provides for a degree of compression of the packing 4. Static O-ring seals 12 and dynamic O-ring seals 13, 16 serve to prevent fluid leakage.

The movement of the ring 2 and clip 3 as the chevron packing 4 moves and is energized by fluid pressure serves to adjust or compensate the packing 4 to ensure that positive seal between the chamber 14 and the shaft 9 is maintained when the gland housing 6, bearings and primary seals 12, 13, 16 are removed as shown in FIG. 2.

Although the above description relates to a specific preferred embodiment as presently contemplated by the inventor, it will be understood that the invention in its broad aspect includes mechanical and functional equivalents of the elements described herein.

I claim:

1. A packing device, for sealing a longitudinal shaft against leakage of a pressurized fluid, the device comprising:

an elongate valve housing having an annular internal chamber about a coaxial rotatable shaft, the chamber having an inner end with an annular stationary packing support shoulder exposed to pressurized fluid and an outer end with an annular packing access opening exposed to ambient air pressure;

annular chevron secondary packing disposed within the chamber, an inner end thereof engaging the stationary packing support shoulder;

an axially slidable ring engaging an outer end of the packing;

a gland housing engaging an outer end of the slidable ring, the gland housing including compression means for loading the packing and primary seals engaging the annular internal chamber; and stop means for limiting the axial movement of the axially slidable ring within the chamber when the gland housing is removed.

2. A packing device according to claim 1, wherein the stop means comprise an annular groove within the interior chamber outward of the packing.

3. A packing device according to claim 2, wherein the stop means includes a floating retaining clip slidably disposed in the groove.

4. A packing device according to claim 1 including a packing retention ring between the stationary packing support shoulder and the packing.

5. A packing device according to claim 1 wherein the compression means comprise a cap releasably mounted to the housing with axial adjustment connectors.

6. A packing device according to claim 5 including dynamic O-ring seals between the cap and the shaft.

7. A packing device according to claim 1 wherein the chevron packing is self travelling pressure energized retained chevron packing.

8. A packing device according to claim 1 including static O-ring seals between the chamber and the gland housing.

* * * * *